US009747442B2

United States Patent
Li et al.

(10) Patent No.: US 9,747,442 B2
(45) Date of Patent: Aug. 29, 2017

(54) PREVENTING MALICIOUS INSTRUCTION EXECUTION (71) Applicant: Intel Corporation, Santa Clara, CA (US)

(72) Inventors: Xiaoning Li, Hillsboro, OR (US); William Wager, Hillsboro, OR (US); Nathan Bixler, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/936,266

(22) Filed: Nov. 9, 2015

(65) Prior Publication Data
US 2016/0063246 A1    Mar. 3, 2016

Related U.S. Application Data (63) Continuation of application No. 13/991,291, filed as application No. PCT/US2013/030522 on Mar. 12, 2013, now Pat. No. 9,183,379.

(51) Int. Cl.
*G06F 21/55* (2013.01)
*G06F 21/56* (2013.01)
(Continued)

(52) U.S. Cl.
CPC .............. *G06F 21/56* (2013.01); *G06F 21/52* (2013.01); *G06F 21/55* (2013.01); *G06F 21/84* (2013.01);
(Continued)

(58) Field of Classification Search
CPC .......... G06F 21/55; G06F 21/50; G06F 21/52; G06F 21/56
See application file for complete search history.

(56) References Cited

U.S. PATENT DOCUMENTS 6,047,388 A       4/2000   Bashore et al.
8,035,648 B1 *   10/2011   Wloka .................. G06T 1/60
                                                         345/501

(Continued)

FOREIGN PATENT DOCUMENTS

KR         100805316 B1     2/2008
KR       1020110060847 A1   6/2011
WO       WO-2014142810 A1   9/2014

OTHER PUBLICATIONS

"U.S. Appl. No. 13/991,291, Non Final Office Action mailed Feb. 9, 2015", 13 pgs.

(Continued)

*Primary Examiner* — Khang Do
(74) *Attorney, Agent, or Firm* — Schwegman Lundberg & Woessner, P.A.

(57) ABSTRACT

Systems and techniques for preventing malicious instruction execution are described herein. A first instance of an instruction for a graphics processing unit (GPU) may be received. The instruction may be placed in a target list. A notification that the instruction caused a problem with the GPU may be received. The instruction may be moved from the target list to a black list in response to the notification. A second instance of the instruction may be received. The second instance of the instruction may be prevented from executing on the GPU in response to the instruction being on the black list.

18 Claims, 5 Drawing Sheets

(51) Int. Cl.
*G06F 21/84* (2013.01)
*G06F 21/52* (2013.01)
*G06T 1/20* (2006.01)
*G06T 1/60* (2006.01)

(52) U.S. Cl.
CPC .................. *G06T 1/20* (2013.01); *G06T 1/60* (2013.01); *G06F 2221/034* (2013.01); *G06T 2200/28* (2013.01)

(56) References Cited

U.S. PATENT DOCUMENTS

| | | | |
|---|---|---|---|
| 8,650,578 | B1 | 2/2014 | Binotto et al. |
| 9,104,873 | B1* | 8/2015 | Chen ..................... G06F 21/566 |
| 9,183,379 | B2 | 11/2015 | Li et al. |
| 2005/0240999 | A1* | 10/2005 | Rubin ................... G06F 21/563 726/22 |
| 2005/0257265 | A1* | 11/2005 | Cook ...................... G06F 21/53 726/23 |
| 2006/0021035 | A1 | 1/2006 | Conti et al. |
| 2006/0031940 | A1 | 2/2006 | Rozman et al. |
| 2008/0313445 | A1 | 12/2008 | Altman et al. |
| 2009/0070878 | A1* | 3/2009 | Wang ................... G06F 21/554 726/24 |
| 2010/0251369 | A1* | 9/2010 | Grant .................... G06F 21/554 726/23 |
| 2012/0075314 | A1* | 3/2012 | Malakapalli .............. G06T 1/20 345/522 |
| 2012/0167217 | A1 | 6/2012 | Mcreynolds |
| 2013/0090115 | A1* | 4/2013 | Deivasigamani ..... H04W 48/20 455/434 |
| 2013/0227521 | A1* | 8/2013 | Bourd ................ G06F 11/3604 717/110 |
| 2014/0109053 | A1 | 4/2014 | Vasudevan et al. |
| 2014/0184617 | A1* | 7/2014 | Palmer ..................... G06T 1/20 345/506 |
| 2014/0310809 | A1 | 10/2014 | Li et al. |

OTHER PUBLICATIONS

"U.S. Appl. No. 13/991,291, Notice of Allowance mailed Jun. 30, 2015", 8 pgs.
"U.S. Appl. No. 13/991,291, Preliminary Amendment filed Jun. 3, 2013", 7 pgs.
"U.S. Appl. No. 13/991,291, Response filed May 11, 2015 to Non Final Office Action mailed Feb. 9, 2015", 9 pgs.
"International Application Serial No. PCT/US2013/030522, International Search Report mailed Dec. 30, 2013", 3 pgs.
"International Application Serial No. PCT/US2013/030522, Written Opinion mailed Dec. 30, 2013", 7 pgs.

\* cited by examiner

PREVENTING MALICIOUS INSTRUCTION EXECUTION

PRIORITY APPLICATIONS

This application is a continuation of U.S. application Ser. No. 13/991,291, filed Jun. 3, 2013, which is a U.S. National Stage Application under 35 U.S.C. §371 from International Application No. PCT/US2013/030522, filed Mar. 12, 2013, all of which are hereby incorporated by reference in their entirety.

TECHNICAL FIELD

Embodiments described herein generally relate to preventing malicious instruction execution.

BACKGROUND

Malcontents may attempt to compromise computing systems for various purposes. Some attacks include the capture and control of a target computing system. Other attacks seek to disrupt the use of a target computing system. A type of this second variety of attacks is known as a denial-of-service (DOS) attack. A DOS attack may cause the target computing system to be unusable for its intended purpose.

A feature of attacks on computing systems includes access to the target computing system. Where there is no access, no attack may be performed. The ubiquitous use of web pages may provide an easy access vector to computing systems for attackers. As web standards evolve to provide richer developer and user experiences, web based instructions may be provided greater access to a computing system's foundational software and hardware resources. One such example includes the ability of web based instructions to access the graphics processing unit (GPU) of a computing system in order to deliver responsive (e.g., fast) three-dimensional (3D) content to users via pervasive web technologies (e.g., web browsers).

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

For performance purposes, many 3D operations are carried out in the hardware of the GPU. An example negative effect of carrying out these operations in the GPU hardware may include a reduced ability, or inability, to correct errors in the operations. For example, a GPU may be installed that permits an instruction or set of instructions to be executed and result in the GPU "hanging" (e.g., refusing to perform further operations). Further, because the GPU is often the sole producer of data to be displayed on a screen, hanging the GPU may result in the entire system being functionally inoperable to the user. Thus, malicious instructions sent to the GPU may be an effective route by which an attacker may employ a DOS attack against a computing system.

Anti-malware products exist that may use a list of known vulnerabilities to inspect and sanitize malicious instructions from executing on the computing system. The list, however, may be out-of-date, thereby rendering it ineffective at times. Further, there is a cost to vendors and users in assembling, providing, and updating the list.

A solution to prevent malicious instruction execution may include providing an interception layer between instruction origination, for example, at a process running on the computing system and the GPU. This interception layer may prevent identified instructions from reaching the GPU and thus prevent attacks. To identify the malicious instructions, the interception layer may track which instructions are being sent to the GPU and receive notification as to whether the GPU experienced a problem with the execution of an instruction. Such notification may indicate a bad instruction or a bad process originating the instruction. In this way, the interception layer does not have to rely on malicious instruction or process lists, but rather may diagnose malicious instructions or processes and remove them from the execution chain before they may cause problems to the computing system. Although the examples discussed herein refer to GPU instructions, the described techniques may be applied to any such hardware component of a computing system.

Figure 1:
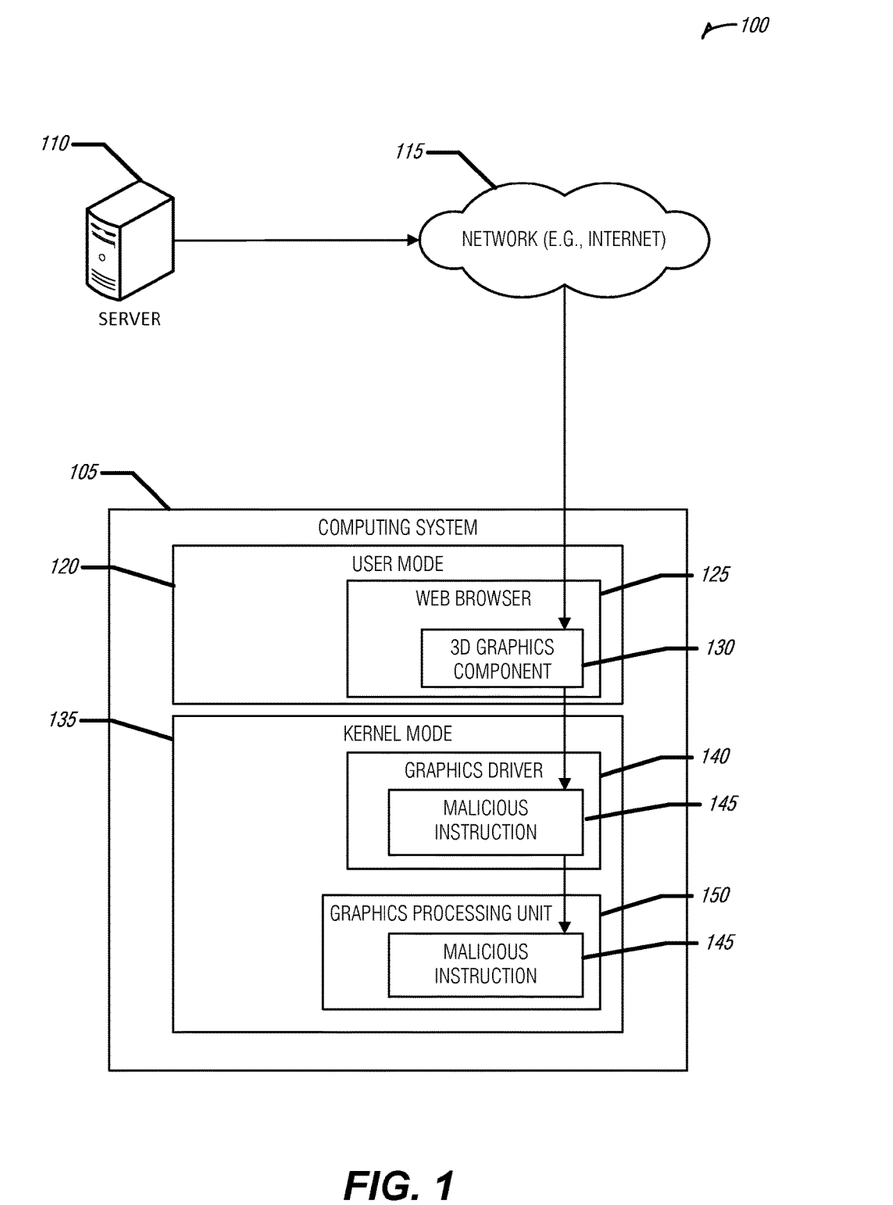
FIG. 1 illustrates an example of a system where malicious code execution may occur, according to an embodiment.

FIG. 1 illustrates an example of a system 100 where malicious code execution may occur. The system 100 may include a computing system 105, a server 110 (e.g., web server), and a network 115 interconnecting the two. The computing system 105 may include a user mode execution environment 120. The user mode execution environment 120 is understood to define resource access rights of the computing system 105 designated for user-space application execution. The computing device 105 may also include a kernel mode execution environment 135. In general, the kernel mode execution environment 135 has greater access rights than the user mode execution environment 120. In an example, the kernel mode execution environment 135 has access rights to all available resources of the computing system 105 (e.g., it is not access limited by a hardware system itself). Generally, applications in the user mode execution environment 120 use interfaces in the kernel mode execution environment 135 to interact with the hardware of the computing system 105.

As an example of how a DOS attack against the GPU may occur, a web browser 125 may receive content with a 3D graphics component 130 from the server 110 via the network 115. The web browser 125 may interface with a kernel mode graphics driver 140 to render the 3D graphics component 130 delivering a malicious instruction 145. The 3D graphics component 130 may include the malicious instruction 145 itself, or may include instructions or data that, when processed by the web browser 125, result in the malicious instruction 145. The malicious instruction 145 may be passed to the GPU 150 by the graphics driver 140 for ultimate rendering on a display. Once the malicious instruction 145 is executed on the GPU 150, the GPU 150 may experience a problem. In an example, the computing device 105 may include a facility to monitor the GPU 150 for problems. In an example, the facility may detect that the GPU 150 has hung (e.g., stopped responding). In an example, the facility may restart the GPU 150, in order to, for example, end any currently executing instructions or reset GPU hardware to achieve a clean (e.g., start) state.

As described above, identifying and intercepting the malicious instruction 145 before it causes a problem with the GPU 150 may prevent the DOS attack. It may therefore be beneficial to place the interception layer between the process (e.g., the web browser 125) and the GPU 150.

Figure 2:
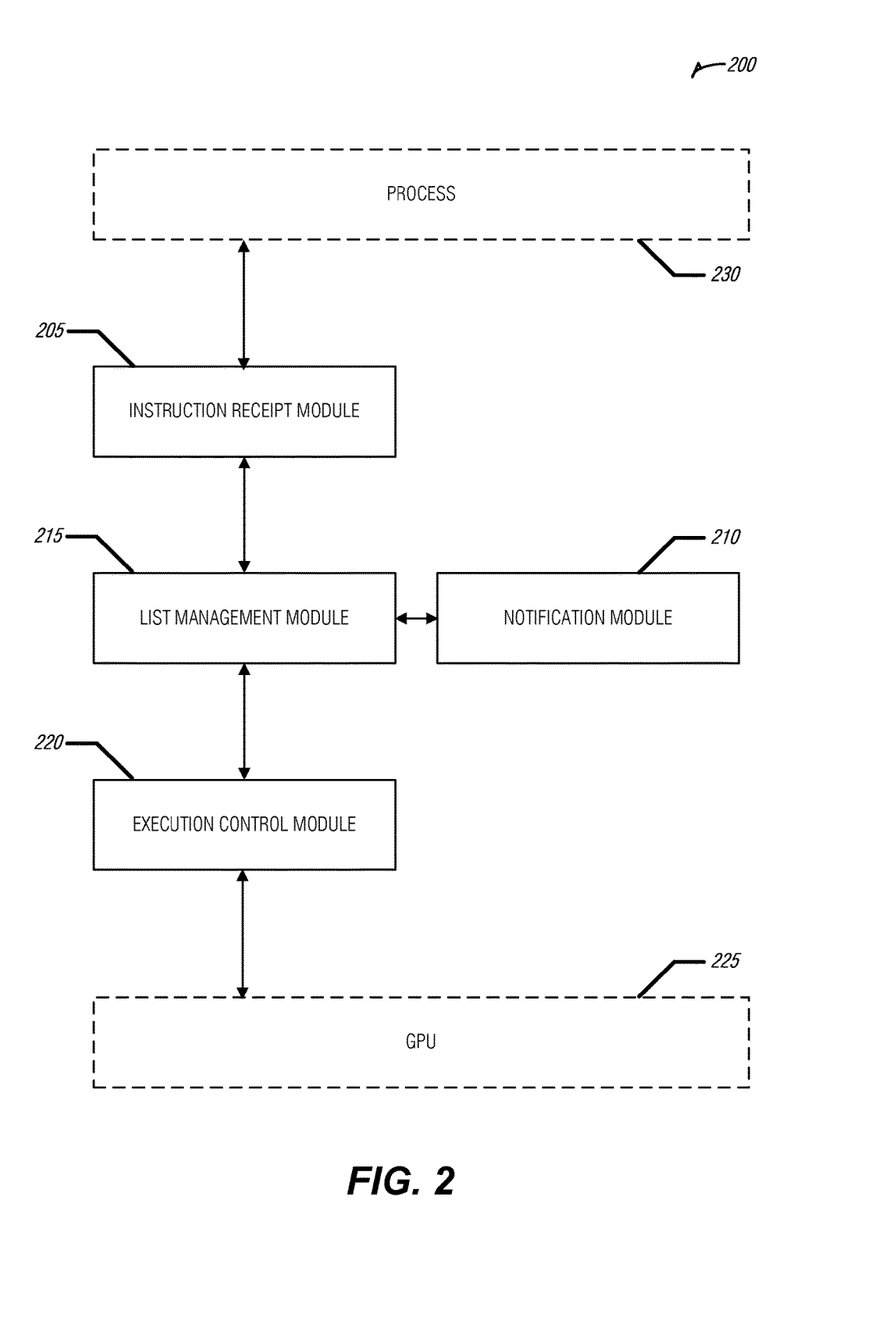
FIG. 2 illustrates an example of a device to prevent malicious instruction execution, according to an embodiment.

FIG. 2 illustrates an example of a device 200 to prevent malicious instruction execution. The device 200 may be placed so as to logically (e.g., including physically) intervene between a process 230 and a GPU 225. Examples of such placement may include within a user mode subsystem, within a kernel mode subsystem (e.g., an operating system (OS) graphics library), within a driver (e.g., the graphics driver 140), or within the GPU 225. In an example, components of the device 200 may be placed in one or more of these locations. The device 200 may include an instruction receipt module 205, a notification module 210, a list management module 215, and an execution control module 220.

The instruction receipt module 205 may be arranged to receive instructions for the GPU 225. Thus, between two instances of an instruction (e.g., the same instruction occurring at two different times), the instruction receipt module 205 may be arranged to receive both the first instance and the second instance of the instruction. In an example, the instruction receipt module is arranged to identify the process 230.

The notification module 210 may be arranged to receive a notification that the instruction caused a problem with the GPU 225. In an example, the problem with the GPU 225 includes the GPU 225 hanging. In an example, the notification module 210 may be arranged to receive the notification as an interrupt from the computing system (e.g., the GPU 225). In an example, the notification module 210 may be arranged to receive the notification from an OS message. In an example, the notification module 210 may be arranged to receive the notification by monitoring the GPU 225. In an example, the notification module 210 may be arranged to receive notification that a second instruction did not cause a problem.

The list management module 215 may be arranged to place the instruction in a target list in response to the receipt of the first instance of the instruction. For example, as the instruction (or each instruction) is received by the instruction receipt module 205, the list management module 215 may place the instruction in the target list. In an example, the target list is a single entry and includes the last instruction sent to the GPU 225 for execution. Thus, the list management module 215 may track instruction execution on the GPU 225.

The list management module 215 may be arranged to move the instruction from the target list to a black list in response to receipt of the notification by the notification module 210. For example, the last instruction executed on the GPU 225 may be identified by its position in the target list. When the device 200 becomes aware that a problem occurred with the GPU 225, this last instruction may be considered the culprit. Accordingly, the list management module 215 may assist in this identification by moving the instruction from the target list to the black list. In an example, the list management module 215 may be arranged to remove the instruction from the black list or the target list after a respective timeout period. This may be effective in maximizing the available instructions to the process 230 while preventing DOS in the following way: if the computing system has a GPU recovery process, but repeated recovery operations with small time intervals between them produces system instability, the timeout period for the blacklist may be set such that it is longer than those time intervals.

In an example, the list management module 215 may be arranged to place the process 230 (e.g., a process identifier, process image, process image name, process name, etc.) originating an instruction (e.g., the first instance or the second instance) of the instruction on the black list. In this example, the process 230 itself may be considered malicious and quarantined as such. In an example, the process 230 may be removed from the black list after a timeout period. The timeout period may be a time configurable by a policy, a user, OS, or other entity with authorized access and configure the computing system 105. In an example, the list management module 215 may be arranged to receive a black-list-removal notification (e.g., message, command, etc.) and remove the process 230 from the black list in response.

The execution control module 220 may be arranged to prevent the instruction from executing on the GPU 225 in response to the instruction being on the black list. In an example, the execution control module 220 may be arranged to pass all instructions from high layers (e.g., the process 230) to the GPU 225, and thus act as a gatekeeper to the GPU 225. In an example, the execution control module 220 may be arranged to access and modify an execution pipeline to the GPU 225, so as to remove the instruction.

In an example, the execution control module 220 may be arranged to restrict access to a GPU resource for the process 230 in response to the process 230 being on the black list. In an example, the execution management module 220 may be arranged to limit GPU memory access to the process 230. In an example, the execution control module 220 may be arranged to prevent a request to access an invalid memory address by the process 230. Restricting GPU memory access by the process 230, when malicious, may provide greater protection against a DOS attack due to the often important role memory plays with respect to system stability.

In an example, the execution control module 220 may be arranged to restrict GPU 245 access to the process 230 by limiting GPU instructions. For example, wherein the GPU 225 is arranged to accept a set of instructions, the execution control module 220 may be arranged to limit the process 230 to a proper subset of that set of instructions. In an example, the execution control module 220 may be arranged to prevent an invalid GPU instruction from being received by the GPU 225. Via these described mechanisms, the execution control module 220 may increase the efficacy of the device 200 by allowing for updates to the GPU instruction set even when the updates cannot be reflected directly in the GPU 225.

In an example, the execution control module 220 may be arranged to prevent an endless loop code piece from being received by the GPU 225. In an example, the endless loop code piece may include a plurality of instructions. An endless loop code piece may include a set of instructions that include a loop without a discernible termination condition. In an example, the execution control module 220 may be arranged to prevent all instructions from the process 230 from being received by the GPU 225. In an example, the execution control module 220 may be arranged to enforce preventing (e.g., actually preventing) all instructions from the process 230 from being received by the GPU 220 for at least one of an instance of the process or a timeout period for a placement of the process on the black list. For example, if the process 230 terminates, the execution control module 220 may be arranged to cease its censure of the process 230 unless or until the process 230 is placed back on the blacklist at a later time.

Figure 3:
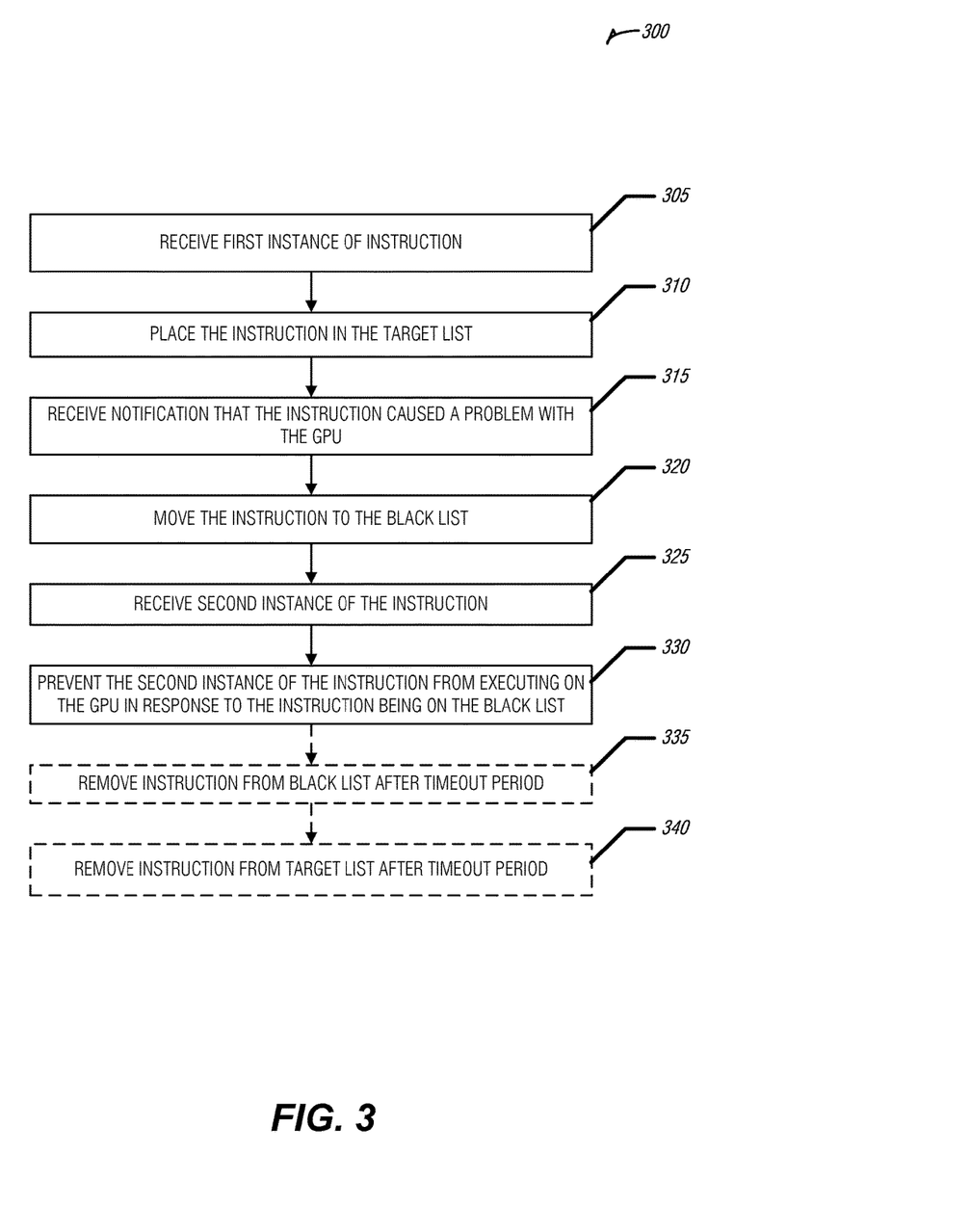
FIG. 3 illustrates an example of a method for preventing malicious code execution, according to an embodiment.

FIG. 3 illustrates an example of a method 300 for preventing malicious code execution. Some or all of the operations of the method 300 may be performed by various elements described above with respect to FIGS. 1 and 2, but may also be performed by other appropriately configured computing hardware.

At operation 305, a first instance of an instruction for a GPU may be received.

At operation 310, the instruction may be placed in a target list.

At operation 315, a notification that the instruction caused a problem with the GPU may be received. In an example, the problem with the GPU may include the GPU hanging.

At operation 320, the instruction may be moved from the target list to a black list in response to the notification that the instruction caused a problem with the GPU. In an example, moving the instruction from the target list to the black list may include restricting access to a GPU resource for a process originating the instruction. In an example, restricting access may include limiting GPU memory access for the process. In an example, limiting GPU memory access may include preventing a request from the process to access an invalid memory address.

In an example, restricting access to the GPU for the process may include limiting GPU instructions available for the process to use. In an example, limiting the GPU instructions may include preventing an invalid GPU instruction from being received by the GPU. In an example, limiting the GPU instructions may include preventing an endless loop code piece from being received by the GPU. In an example, limiting the GPU instructions may include preventing a faulty instruction from being received by the GPU. In this example, the faulty instruction is a valid GPU instruction that causes the GPU an error, for example, from a latent bug identified in the installed GPU.

In an example, restricting access to the GPU by the process may include preventing all instructions from the process from being received by the GPU. Thus, the process is precluded from interacting with the GPU. In an example, preventing all instructions from the process from being received by the GPU is only enforced for at least one of an instance of the process or a timeout period. For example, the sanction against the process may be specific to an instance of the process or for a specified timeout period.

At operation 325, a second instance of the instruction may be received.

At operation 330, the second instance of the instruction may be prevented from executing on the GPU in response to the instruction being on the black list. Thus, the method 300 is able to identify problematic instructions based on observed behavior of the system rather than relying on possibly unreliable external lists of malicious instructions.

At operation 335, the instruction may optionally be removed from the black list after a timeout period.

At operation 340, the instruction may optionally be removed from the target list after a timeout period.

Figure 4:
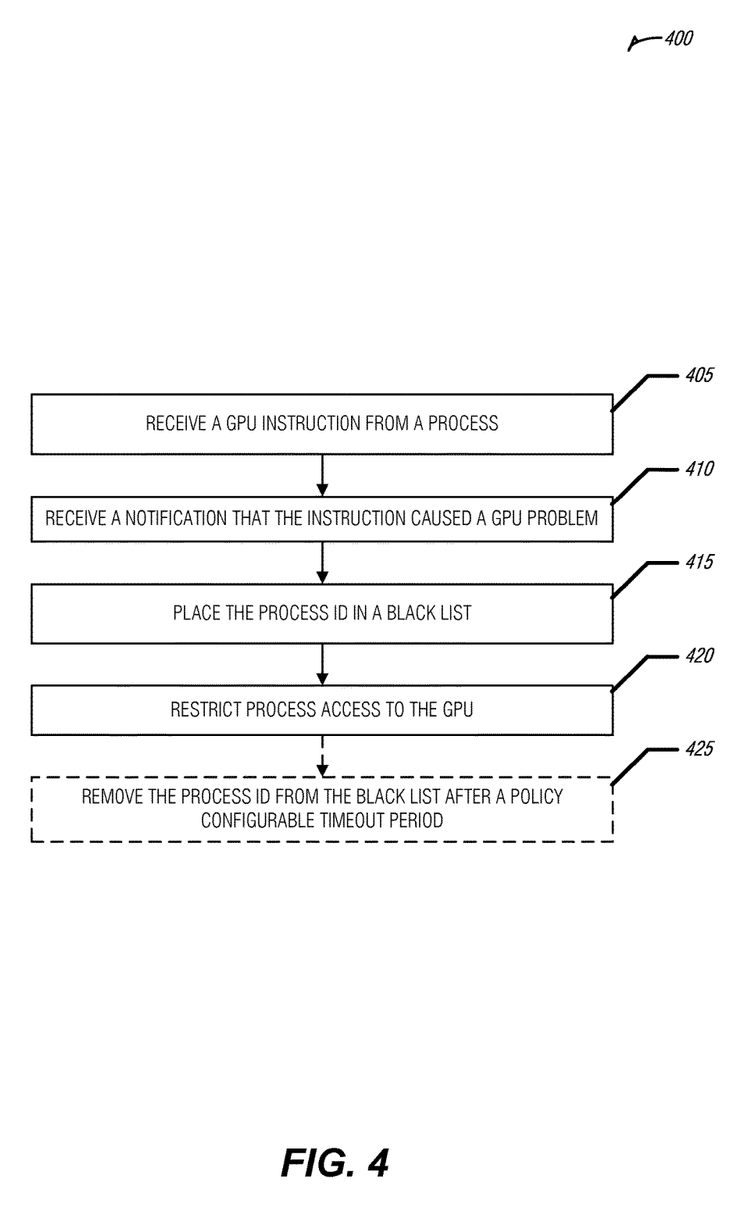
FIG. 4 illustrates an example of a method for preventing malicious code execution, according to an embodiment.

FIG. 4 illustrates an example of a method 400 for preventing malicious code execution. Some or all of the operations of the method 300 may be performed by various elements described above with respect to FIGS. 1 and 2, but may also be performed by other appropriately configured computing hardware.

At operation 405, an instruction for a GPU may be received from a process.

At operation 410, a notification that the instruction caused a problem with the GPU may be received. In an example, the problem with the GPU may include the GPU hanging.

At operation 415, an identifier of the process may be placed in a black list in response to the notification of operation 410.

At operation 420, process access to the GPU may be restricted in response to the identifier of the process being on the black list. In an example, restricting access of the process to the GPU may include restricting access to a GPU resource for the process. In an example, the GPU resource may include GPU memory. In an example, restricting access to the GPU memory may include preventing a request to access an invalid memory address.

In an example, the GPU resource may include GPU instructions. In an example, restricting access to the GPU instructions may include preventing an invalid GPU instruction from being received by the GPU. In an example, restricting access to the GPU instructions may include preventing an endless loop code piece (e.g., collection of instructions forming an endless loop) from being received by the GPU. In an example, restricting access to the GPU instructions may include preventing a faulty instruction from being received by the GPU. In an example, a faulty instruction is a valid GPU instruction that causes the GPU an error when executed, such as is caused by a bug in the GPU. In an example, restricting access to the GPU instructions may include preventing all instructions from the process from being received by the GPU. In an example, preventing all instruction from being received by the GPU may include preventing all instructions for a policy configurable timeout period (e.g., five seconds).

At operation 425, the identifier of the process may be removed from the blacklist after a policy configurable timeout period.

Figure 5:
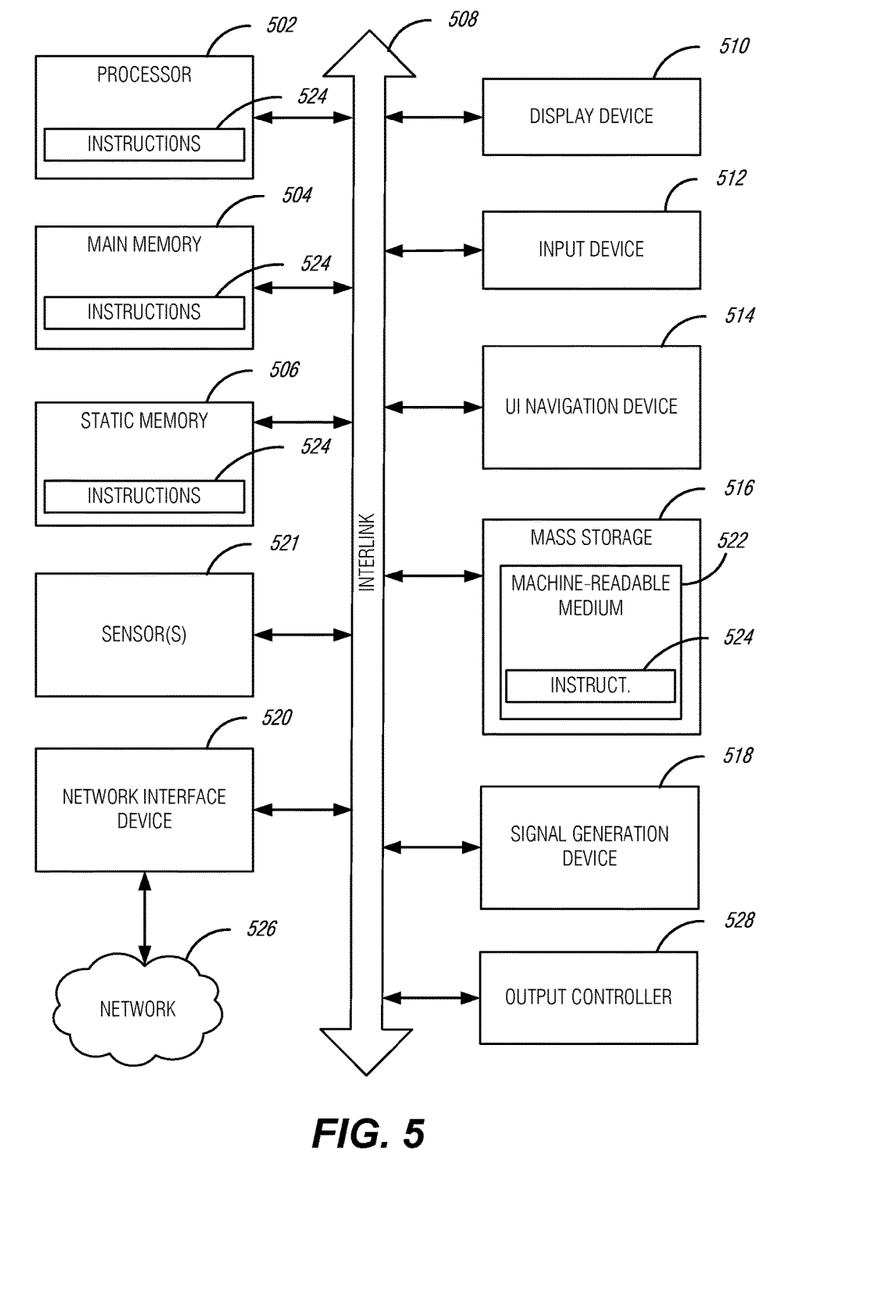
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

ADDITIONAL NOTES & EXAMPLES

Example 1 includes subject matter (such as a system, apparatus, or device for preventing malicious instruction execution) comprising an instruction receipt module arranged to receive a first instance of an instruction for a graphics processing unit (GPU), and receiving a second instance of the instruction. The subject matter of Example 1 may also include a notification module arranged to receive a notification that the instruction caused a problem with the GPU. The subject matter of Example 1 may also include a list management module arranged to place the instruction in a target list in response to the receipt of the first instance of the instruction, and move the instruction from the target list to a black list in response to the notification. The subject matter of Example 1 may also include an execution control module arranged to prevent the second instance of the instruction from executing on the GPU in response to the instruction being on the black list.

In Example 2, the subject matter of Example 1 may optionally include, wherein to move the instruction from the target list to the black list includes the list management module arranged to place a process originating the first instance of the instruction on the black list, and wherein the execution management module is arranged to restrict access to a GPU resource for the process in response to the process being on the black list.

In Example 3, the subject matter of Example 2 may optionally include, wherein to restrict access includes the execution management module arranged to limit GPU memory access.

In Example 4, the subject matter of Example 3 may optionally include, wherein to limit GPU memory access includes the execution management module arranged to prevent a request to access an invalid memory address.

In Example 5, the subject matter of any one or more of Examples 2-4 may optionally include, wherein to restrict access includes the execution management module arranged to limit GPU instructions.

In Example 6, the subject matter of Example 5 may optionally include, wherein to limit GPU instructions access includes the execution management module arranged to prevent an invalid GPU instruction from being received by the GPU.

In Example 7, the subject matter of any one or more of Examples 5-6 may optionally include, wherein to limit GPU instruction access includes the execution management module arranged to prevent an endless loop code piece from being received by the GPU.

In Example 8, the subject matter of any one or more of Examples 5-7 may optionally include, wherein to limit GPU instruction access includes the execution management module arranged to prevent a faulty instruction from being received by the GPU, wherein the faulty instruction is a valid GPU instruction that causes the GPU an error when executed.

In Example 9, the subject matter of any one or more of Examples 2-8 may optionally include, wherein to restrict access includes the execution management module arranged to prevent all instructions from the process from being received by the GPU.

In Example 10, the subject matter of Example 9 may optionally include, wherein the execution management module is arranged to enforce preventing all instructions from the process from being received by the GPU for at least one of an instance of the process or a timeout period for a placement of the process on the black list.

In Example 11, the subject matter of any one or more of Examples 1-10 may optionally include, wherein the list management module is arranged to remove the instruction from the black list after a timeout period.

In Example 12, the subject matter of any one or more of Examples 1-11 may optionally include, wherein the list management module is arranged to remove the instruction from the target list after a timeout period.

In Example 13, the subject matter of any one or more of Examples 1-12 may optionally include, wherein the problem with the GPU includes the GPU hanging.

Example 14 may include, or may optionally be combined with the subject matter of any one of Examples 1-13 to include subject matter (such as a method, means for performing acts, or machine readable medium including instructions that, when performed by a machine cause the machine to performs acts) comprising receiving a first instance of an instruction for a graphics processing unit (GPU), placing the instruction in a target list, receiving a notification that the instruction caused a problem with the GPU, moving the instruction from the target list to a black list in response to the notification, receiving a second instance of the instruction, and preventing the second instance of the instruction from executing on the GPU in response to the instruction being on the black list.

In Example 15, the subject matter of Example 14 may optionally include, wherein moving the instruction from the target list to the black list includes restricting access to a GPU resource for a process originating the first instance of the instruction.

In Example 16, the subject matter of Example 15 may optionally include, wherein restricting access includes limiting GPU memory access.

In Example 17, the subject matter of Example 16 may optionally include, wherein limiting GPU memory access includes preventing a request to access an invalid memory address.

In Example 18, the subject matter of any of Examples 15-17 may optionally include, wherein restricting access includes limiting GPU instructions.

In Example 19, the subject matter of Example 18 may optionally include, wherein limiting GPU instructions includes preventing an invalid GPU instruction from being received by the GPU.

In Example 20, the subject matter of any one or more of Examples 18-19 may optionally include, wherein limiting GPU instructions includes preventing an endless loop code piece from being received by the GPU.

In Example 21, the subject matter of any one or more of Examples 18-20 may optionally include, wherein limiting GPU instructions includes preventing a faulty instruction from being received by the GPU, wherein the faulty instruction is a valid GPU instruction that causes the GPU an error.

In Example 22, the subject matter of any one or more of Examples 15-21 may optionally include, wherein restricting access includes preventing all instructions from the process from being received by the GPU.

In Example 23, the subject matter of any one or more of Examples 22-23 may optionally include, wherein preventing all instructions from the process from being received by the GPU is only enforced for at least one of an instance of the process or a timeout period.

In Example 24, the subject matter of any one or more of Examples 14-23 may optionally include, wherein the instructions comprise removing the instruction from the black list after a timeout period.

In Example 25, the subject matter of any one or more of Examples 14-24 may optionally include, wherein the instructions comprise removing the instruction from the target list after a timeout period.

In Example 26, the subject matter of any one or more of Examples 14-25 may optionally include, wherein the problem with the GPU includes the GPU hanging.

Example 27 may include, or may optionally be combined with the subject matter of any one of Examples 1-27 to include subject matter (such as a system, apparatus, or device for preventing malicious instruction execution) comprising an instruction receipt module arranged to receive an instruction for a graphics processing unit (GPU) from a process, a notification module arranged to receive a notification that the instruction caused a problem with the GPU, a list management module arranged to place an identifier of the process in a black list in response to the notification, and an execution control module arranged to restrict access of the process to the GPU in response to the identifier of the process being on the black list.

In Example 28, the subject matter of Example 27 may include, wherein to restrict access of the process to the GPU includes the execution management module arranged to restrict access to a GPU resource for the process.

In Example 29, the subject matter of Example 28 may include, wherein the GPU resource includes GPU memory.

In Example 30, the subject matter of Example 29 may include, wherein to restrict access to the GPU memory includes the execution management module arranged to prevent a request to access an invalid memory address.

In Example 31, the subject matter of any one or more of Examples 28-30 may include, wherein the GPU resource includes GPU instructions.

In Example 32, the subject matter of Example 31 may include, wherein to restrict access to the GPU instructions includes the execution management module arranged to prevent an invalid GPU instruction from being received by the GPU.

In Example 33, the subject matter of any one or more of Examples 31-32 may include, wherein to restrict access to the GPU instructions includes the execution management module arranged to prevent an endless loop code piece from being received by the GPU.

In Example 34, the subject matter of any one or more of Examples 31-33 may include, wherein to restrict access to the GPU instructions includes the execution management module arranged to prevent a faulty instruction from being received by the GPU—wherein the faulty instruction is a valid GPU instruction that causes the GPU an error when executed.

In Example 35, the subject matter of any one or more of Examples 28-34 may include, wherein to restrict to the GPU instructions includes the execution management module arranged to prevent all instructions from the process from being received by the GPU.

In Example 36, the subject matter of Example 35 may include, wherein the execution management module is arranged to enforce preventing all instructions from the process from being received by the GPU for a policy configurable timeout period.

In Example 37, the subject matter of any one or more of Examples 27-36 may include, wherein the list management module is arranged to remove the identifier of the process from the black list after a policy configurable timeout period.

In Example 38, the subject matter of any one or more of Examples 27-37 may include, wherein the problem with the GPU includes the GPU hanging.

Example 39 may include, or may optionally be combined with the subject matter of any one of Examples 1-38 to include subject matter (such as a method, means for performing acts, or machine readable medium including instructions that, when performed by a machine cause the machine to performs acts) comprising receiving an instruction for a graphics processing unit (GPU) from a process, receiving a notification that the instruction caused a problem with the GPU, placing an identifier of the process in a black list in response to the notification, and restricting access of the process to the GPU in response to the identifier of the process being on the black list.

In Example 40, the subject matter of Example 39 may include, wherein restricting access of the process to the GPU includes restricting access to a GPU resource for the process.

In Example 41, the subject matter of Example 40 may include, wherein the GPU resource includes GPU memory.

In Example 42, the subject matter of Example 41 may include, wherein restricting access to the GPU memory includes preventing a request to access an invalid memory address.

In Example 43, the subject matter of any one or more of Examples 40-42 may include, wherein the GPU resource includes GPU instructions.

In Example 44, the subject matter of Example 43 may include, wherein restricting access to the GPU instructions includes preventing an invalid GPU instruction from being received by the GPU.

In Example 45, the subject matter of any one or more of Examples 43-44 may include, wherein restricting access to the GPU instructions includes preventing an endless loop code piece from being received by the GPU.

In Example 46, the subject matter of any one or more of Examples 43-45 may include, wherein restricting access to the GPU instructions includes preventing a faulty instruction from being received by the GPU—wherein the faulty instruction is a valid GPU instruction that causes the GPU an error when executed.

In Example 47, the subject matter of any one or more of Examples 40-46 may include, wherein restricting access to the GPU instructions includes preventing all instructions from the process from being received by the GPU.

In Example 48, the subject matter of Example 47 may include, wherein preventing all instructions from the process from being received by the GPU includes preventing all instructions for a policy configurable timeout period.

In Example 49, the subject matter of any one or more of Examples 37-48 may include wherein the operations comprise removing the identifier of the process from the black list after a policy configurable timeout period.

In Example 50, the subject matter of any one or more of Examples 37-49 may include, wherein the problem with the GPU includes the GPU hanging.

Example 51 may include, or may optionally be combined with the subject matter of any one of Examples 1-50 to include subject matter (such as a method, means for performing acts, or machine readable medium including instructions that, when performed by a machine cause the machine to performs acts) comprising an instruction receipt means for receiving an instruction for a graphics processing unit (GPU) from a process; a notification module means for receiving a notification that the instruction caused a problem with the GPU; a list management means for placing an identifier of the process in a black list in response to the notification; and an execution control means for restricting access of the process to the GPU in response to the identifier of the process being on the black list.

In Example 52, the subject matter of Example 50 may include, wherein the execution control means for restricting access of the process to the GPU include means for restricting access to a GPU resource for the process.

In Example 53, the subject matter of Example 52 may include, wherein the GPU resource includes GPU memory.

In Example 54, the subject matter of Example 53 may include, wherein the means for restricting access to the GPU memory include means for preventing a request to access an invalid memory address.

The above detailed description includes references to the accompanying drawings, which form a part of the detailed description. The drawings show, by way of illustration, specific embodiments in that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A device for preventing malicious instruction execution, the device comprising:
   an instruction receipt module arranged to receive an instruction for a graphics processing unit (GPU) from a process;
   a notification module arranged to receive a notification that the instruction caused a problem with the GPU;
   a list management module arranged to place an identifier of the process in a black list in response to the notification; and
   an execution control module arranged to restrict access of the process to the GPU in response to the identifier of the process being on the black list, wherein to restrict access of the process to the GPU includes the execution management control module to intercept a faulty instruction from the process and to prevent the faulty instruction from being received by the GPU, wherein the faulty instruction is a valid GPU instruction that causes the GPU an error when executed.

2. The device of claim 1, wherein to restrict access of the process to the GPU includes the execution control module arranged to restrict access to a GPU resource for the process.

3. The device of claim 2, wherein the GPU resource includes GPU memory.

4. The device of claim 3, wherein to restrict access to the GPU memory includes the execution control module arranged to prevent a request to access an invalid memory address.

5. The device of claim 2, wherein the GPU resource includes GPU instructions.

6. The device of claim 5, wherein to restrict access to the GPU instructions includes the execution control module arranged to prevent an endless loop code piece from being received by the GPU.

7. The device of claim 5, wherein to restrict to the GPU instructions includes the execution control module arranged to prevent all instructions from the process from being received by the GPU.

8. The device of claim 2, wherein the list management module is arranged to remove the identifier of the process from the black list after a policy configurable timeout period.

9. A non-transitory machine-readable medium including instructions, which when executed by a machine, cause the machine to perform operations for preventing malicious instruction execution, the operations comprising:
   receiving an instruction for a graphics processing unit (GPU) from a process;
   receiving a notification that the instruction caused a problem with the GPU;
   placing an identifier of the process in a black list in response to the notification; and
   restricting access of the process to the GPU in response to the identifier of the process being on the black list, wherein restricting access of the process to the GPU includes intercepting a faulty instruction from the process and preventing the faulty instruction from being received by the GPU, wherein the faulty instruction is a valid GPU instruction that causes the GPU an error when executed.

10. The machine-readable medium of claim 9, wherein restricting access of the process to the GPU includes restricting access to a GPU resource for the process.

11. The machine-readable medium of claim 10, wherein the GPU resource includes GPU memory.

12. The machine-readable medium of claim 10, wherein the GPU resource includes GPU instructions.

13. The machine-readable medium of claim 12, wherein restricting access to the GPU instructions includes preventing an endless loop code piece from being received by the GPU.

14. The machine-readable medium of claim 9, wherein restricting access to the GPU instructions includes preventing all instructions from the process from being received by the GPU.

15. The machine-readable medium of claim 9, wherein the operations comprise removing the identifier of the process from the black list after a policy configurable timeout period.

16. A method for preventing malicious instruction execution, the method comprising:
   receiving an instruction for a graphics processing unit (GPU) from a process;

receiving a notification that the instruction caused a problem with the GPU;

placing an identifier of the process in a black list in response to the notification; and restricting access of the process to the GPU in response to the identifier of the process being on the black list, wherein restricting access of the process to the GPU includes intercepting a faulty instruction from the process and preventing the faulty instruction from being received by the GPU, wherein the faulty instruction is a valid GPU instruction that causes the GPU an error when executed.

17. The method of claim 16, wherein restricting access of the process to the GPU includes restricting access to a GPU resource for the process.

18. The method of claim 17, wherein the GPU resource includes GPU memory.

* * * * *